United States Patent
Min et al.

(10) Patent No.: US 10,326,313 B2
(45) Date of Patent: Jun. 18, 2019

(54) WIRELESS POWER TRANSMITTER AND METHOD FOR WIRELESSLY TRANSMITTING POWER

(71) Applicant: Samsung Electro-Mechanics Co., Ltd., Suwon-si (KR)

(72) Inventors: Sang Hyun Min, Suwon-si (KR); Jung Tae Kim, Suwon-si (KR); Jung Hyun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 248 days.

(21) Appl. No.: 15/408,107

(22) Filed: Jan. 17, 2017

(65) Prior Publication Data

US 2017/0250574 A1    Aug. 31, 2017

(30) Foreign Application Priority Data

Feb. 25, 2016  (KR) .................. 10-2016-0022387

(51) Int. Cl.
*H02J 50/12* (2016.01)
*H02J 7/02* (2016.01)
*H02J 50/50* (2016.01)
*H02J 50/90* (2016.01)
*H02J 50/40* (2016.01)

(52) U.S. Cl.
CPC ............ *H02J 50/12* (2016.02); *H02J 7/025* (2013.01); *H02J 50/40* (2016.02); *H02J 50/50* (2016.02); *H02J 50/90* (2016.02)

(58) Field of Classification Search
CPC ...................................................... H02J 50/12
USPC ...................................................... 307/104
See application file for complete search history.

(56) References Cited

U.S. PATENT DOCUMENTS

| | | | |
|---|---|---|---|
| 9,479,225 B2 * | 10/2016 | Wheatley, III | H02J 7/025 |
| 2012/0025627 A1 | 2/2012 | Shionoiri et al. | |
| 2013/0106197 A1 | 5/2013 | Bae et al. | |
| 2015/0207333 A1 * | 7/2015 | Baarman | H02J 5/005 307/104 |

FOREIGN PATENT DOCUMENTS

KR   10-2013-0048438 A   5/2013
KR   10-2013-0099015 A   9/2013

* cited by examiner

*Primary Examiner* — Joseph Chang
(74) *Attorney, Agent, or Firm* — NSIP Law

(57) ABSTRACT

A wireless power transmitter includes a converter configured to output an alternating current (AC) voltage in response to a transmission control signal; a power transmitter including a power transmitting coil and configured to vary an impedance in response to a resonance control signal, and to receive the AC voltage to wirelessly transmit power; and a controller configured to determine whether a wireless power receiver is present while varying the transmission control signal and the resonance control signal.

17 Claims, 10 Drawing Sheets

WIRELESS POWER TRANSMITTER AND METHOD FOR WIRELESSLY TRANSMITTING POWER

CROSS-REFERENCE TO RELATED APPLICATION(S)

This application claims benefit under 35 USC § 119(a) of Korean Patent Application No. 10-2016-0022387, filed on Feb. 25, 2016, in the Korean Intellectual Property Office, the entire disclosure of which is incorporated herein by reference for all purposes.

BACKGROUND

1. Field

The present disclosure relates to a wireless power transmitter that wirelessly transmits power, and a method for wirelessly transmitting power.

2. Description of Related Art

Wireless power transfer technology has been widely used in the area of chargers of various communications devices, including smartphones, and home appliances, and is a technology having a very wide field of application, which may also be used for an electric vehicle, or the like, in the future. In the wireless power transfer technology field, various attempts at increasing a wireless power transmitting distance as well as a degree of freedom in charging target positioning have been conducted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a wireless power transmitter includes a converter configured to output an alternating current (AC) voltage in response to a transmission control signal; a power transmitter including a power transmitting coil and configured to vary an impedance in response to a resonance control signal, and to receive the AC voltage to wirelessly transmit power; and a controller configured to determine whether a wireless power receiver is present while varying the transmission control signal and the resonance control signal.

The controller may be configured to perform a first sensing operation of determining whether or not the wireless power receiver is present based on a magnitude of a detected voltage across the power transmitting coil, while varying the transmission control signal and the resonance control signal, and a second sensing operation of redetermining whether or not the wireless power receiver is present based on a signal received from the wireless power receiver; and output of the transmission control signal so that power for charging is wirelessly transmitted through the power transmitter after performing the first sensing operation and the second sensing operation.

The controller may be further configured: as a result of performing the first sensing operation, if it is determined that the wireless power receiver is present, to perform the second sensing operation.

The controller may be further configured to perform the second sensing operation by determining a frequency of the transmission control signal while performing the first sensing operation, and output the transmission control signal having the frequency determined after performing the first sensing operation.

The controller may be further configured to perform the first sensing operation by outputting the transmission control signal having an initial operating frequency, calculate a voltage variation, a difference between the voltage across the power transmitting coil in a state in which the wireless power receiver is not present and the detected voltage, compare the voltage variation with a minimum threshold value and a resonance point retrieval threshold value greater than the minimum threshold value, and determine whether the wireless power receiver is present while changing a frequency of the transmission control signal after changing impedance of the power transmitter in a case in which the voltage variation is between the minimum threshold value and the resonance point retrieval threshold value.

The controller may be further configured to selectively bypass varying the frequency of the transmission control signal and the resonance control signal in response to a determination that the voltage variation is lower than the minimum threshold value, or is equal to the resonance point retrieval threshold value or more.

The controller may be further configured to retrieve a resonance point at which the voltage variation is a substantially maximum voltage variation while changing the frequency of the transmission control signal between the initial operating frequency and a retrieval end frequency in response to a determination that the voltage variation is a substantially minimum threshold value or more, and is lower than the resonance point retrieval threshold value, and change the resonance control signal in response to a determination that the voltage variation is lower than a resonance gain increase threshold value in a case in which the transmission control signal having a frequency of the resonance point is output.

The controller may be further configured to retrieve the frequency of the transmission control signal at which the voltage variation is the substantially maximum voltage variation while changing the frequency of the transmission control signal between the frequency of the resonance point and the retrieval end frequency after changing the resonance control signal to set the retrieved frequency as the operating frequency, and perform the second sensing operation.

The power transmitter may further include a variable capacitance circuit configured to have capacitance varied in response to the resonance control signal.

The power transmitter may further include a variable inductor configured to have an inductance varied in response to the resonance control signal.

The controller may include a sensor configured to detect a voltage across the power transmitting coil to output a sensed voltage; and a control signal generator configured to determine a frequency of the transmission control signal and a value of the resonance control signal in response to the sensed voltage, and output the transmission control signal and the resonance control signal.

The sensor may include an offset remover configured to output a detection voltage obtained by removing an offset voltage from the voltage across the power transmitting coil; a voltage divider configured to t divide the detection voltage to output the sensed voltage; a direct voltage (DC) voltage setter configured to set a DC offset of the sensed voltage; and a filter configured to remove a noise component of the sensed voltage.

According to another general aspect, a method for wirelessly transmitting power, the method includes determining whether a wireless power receiver is present while varying either one or both of an impedance and a capacitance of a power transmitter receiving an alternate current (AC) voltage to wirelessly transmit power; and in response to the determination that the wireless power receiver is present, wirelessly transmitting the power to the wireless power receiver.

The determining of whether the wireless power receiver is present may include determining whether the wireless power receiver is present based on magnitude of a voltage across a power transmitting coil of the power transmitter; and as a result of the determination of whether the wireless power receiver is present, when it is determined that the wireless power receiver is present, redetermining whether the wireless power receiver is present using a signal received from the wireless power receiver, and varying either one or both of the impedance and the capacitance of the power transmitter while the determining of whether the wireless power receiver is present based on the magnitude of the voltage across the power transmitting coil of the power transmitter is performed.

The determining of whether the wireless power receiver is present based on the magnitude of the voltage across the power transmitting coil of the power transmitter may include generating the AC voltage having an initial operating frequency, and comparing a voltage variation, a difference between a detected voltage, the voltage across the power transmitting coil, and a voltage across the power transmitting coil in a state in which the wireless power receiver is not present, with a minimum threshold value and a resonance point retrieval threshold value; in response to the voltage variation being the minimum threshold value or more and being lower than the resonance point retrieval threshold value, detecting a resonance point at which the voltage variation is the substantially maximum voltage variation while changing the frequency of the AC voltage between the initial operating frequency and a retrieval end frequency; and when the voltage variation at the resonance point is smaller than a resonance gain increase threshold value, adjusting the impedance of the power transmitter.

The determining of whether the wireless power receiver is present based on the magnitude of the voltage across the power transmitting coil of the power transmitter may further include setting a frequency at which the voltage variation is the substantially maximum voltage variation as an operating frequency while changing the frequency of the AC voltage between the frequency of the resonance point and the retrieval end frequency after adjusting the impedance of the power transmitter, and in the redetermining of whether the wireless power receiver is present using the signal received from the wireless power receiver and the wirelessly transmitting of the power to the wireless power receiver, the AC voltage having the operating frequency is applied to the power transmitter.

According to another general aspect, a wireless power transmitter includes a switching circuit; a variable resonance circuit; a power transmitting coil; and, a transmission controller coupled to the power transmitting coil, the switching circuit, and the variable resonance circuit, the transmission controller being configured to identify a substantially maximum sensed voltage by: adaptively actuating the switching circuit to vary an operating frequency of a power supply and supply power to the power transmitting coil, and adaptively actuating the variable resonance circuit to vary an impedance in response to a voltage sensed across the power transmitting coil while the power is supplied thereto.

According to another general aspect, a method for wirelessly transmitting power includes actuating a power transmission coil to transmit wireless power; actuating a controller coupled to the power transmission coil to: determine a voltage at a sensor coupled to the power transmission coil, vary a resonance frequency of the transmission coil until a substantially optimal voltage is identified; actuate the power transmission coil to transmit wireless power for a predetermined time at the resonance frequency corresponding with the substantially optimal voltage while awaiting wireless reception of a data packet.

The method may further include varying the resonance frequency to fit within a range specified in a predetermined wireless power transmission standard.

A non-transitory computer-readable storage medium may store instructions that, when executed by a processor, cause the processor to perform the methods described.

Other features and aspects will be apparent from the following detailed description, the drawings, and the claims.

BRIEF DESCRIPTION OF THE DRAWINGS

The above and other aspects, features and other advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
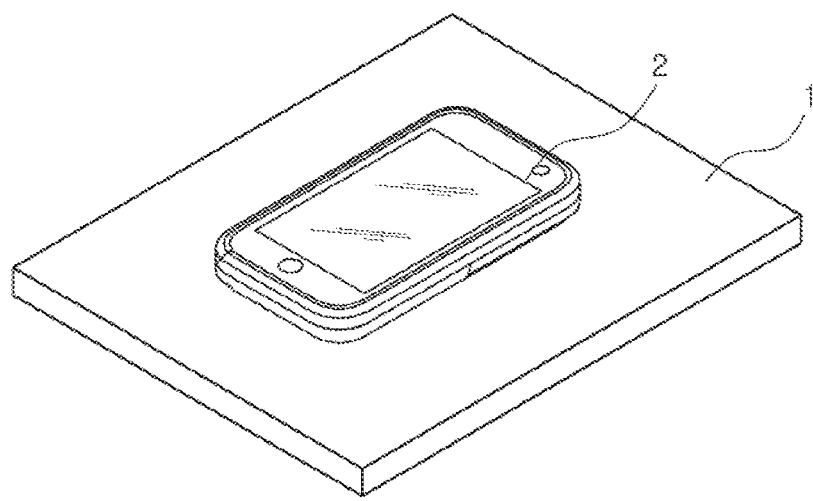
FIG. 1 illustrates a wireless power transmitting system including a wireless power transmitter and a wireless power receiver according to an embodiment.

The following detailed description is provided to assist the reader in gaining a comprehensive understanding of the method and apparatus described herein. However, after an understanding of the present disclosure, various changes, modifications, and equivalents of the method and apparatus described herein may then be apparent to one of ordinary skill in the art. The sequences of operations described herein are merely non-limiting examples, and are not limited to those set forth herein, but may be changed, as will be apparent to one of ordinary skill in the art, with the exception of operations necessarily occurring in a certain order, after an understanding of the present disclosure. Also, descriptions of functions and constructions that may be understood, after an understanding of differing aspects of the present disclosure, may be omitted in some descriptions for increased clarity and conciseness.

Various alterations and modifications may be made to embodiments, some of which will be illustrated in detail in the drawings and detailed description. However, it should be understood that these embodiments are not construed as limited to the disclosure and illustrated forms and should be understood to include all changes, equivalents, and alternatives within the idea and the technical scope of this disclosure.

Terms used herein are to merely explain specific embodiments, thus they are not meant to be limiting. A singular expression includes a plural expression except when two expressions are contextually different from each other. For example, as used herein, the singular forms "a", "an", and "the" are intended to include the plural forms as well, unless the context clearly indicates otherwise. Herein, a term "include" or "have" are also intended to indicate that characteristics, figures, operations, components, or elements disclosed in the specification or combinations thereof exist. The term "include" or "have" should be understood so as not to preclude existence of one or more other characteristics, figures, operations, components, elements or combinations thereof. In addition, though terms such as first, second, A, B, (a), (b), and the like may be used herein to describe components, unless indicated otherwise, these terminologies are not used to define an essence, order, or sequence of a corresponding component but used merely to distinguish the corresponding component from other component(s) for clarity purposes. Furthermore, any recitation of ranges of values herein are merely intended to serve as a shorthand method of referring individually to each separate value falling within the range, unless otherwise indicated herein, and each separate value is incorporated into the specification as if it were individually recited herein.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, embodiments will now be described in detail with reference to the accompanying drawings.

FIG. 1 illustrates a wireless power transmitting system including a wireless power transmitter and a wireless power receiver according to an embodiment. The wireless power transmitting system, according to an embodiment, includes a device 2 including a wireless power receiver and a wireless power transmitter 1.

The wireless power transmitter 1 wirelessly transmits power. The wireless power transmitter 1 includes a power transmitting coil 10-1 (as seen, for example, in FIG. 2) that receives an alternating current (AC) power and wirelessly transmits the power.

The device 2 including the wireless power receiver receives the power which is wirelessly transmitted by the wireless power transmitter 1, and charges a battery in the device 2, and/or perform various other functions using the received power. For example, the device 2 also displays a variety of information on a display device thereof, and may also perform a mobile communications function through a communications module, a microphone, and a speaker using energy stored in the battery and/or the received power.

Although FIG. 1 illustrates a case in which the device 2 (including the wireless power receiver) is a smartphone, the wireless power transmitter 1 according to an embodiment may supply the power to various devices capable of receiving the power, which is wirelessly transmitted, such as an electric car, or the like, as well as a variety of home appliances such as a robot, vacuum, or other electronic device.

Figure 2:
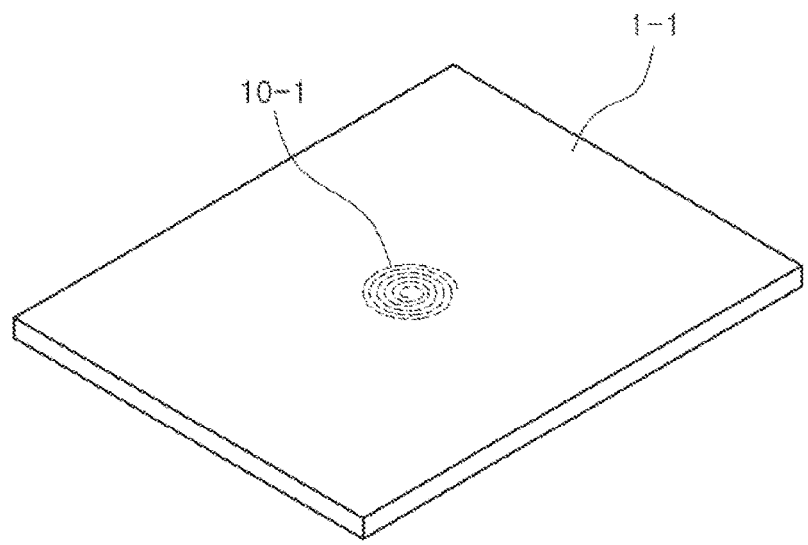
FIGS. 2 and 3 illustrate an exterior of the wireless power transmitter according to an embodiment.
Figure 3:
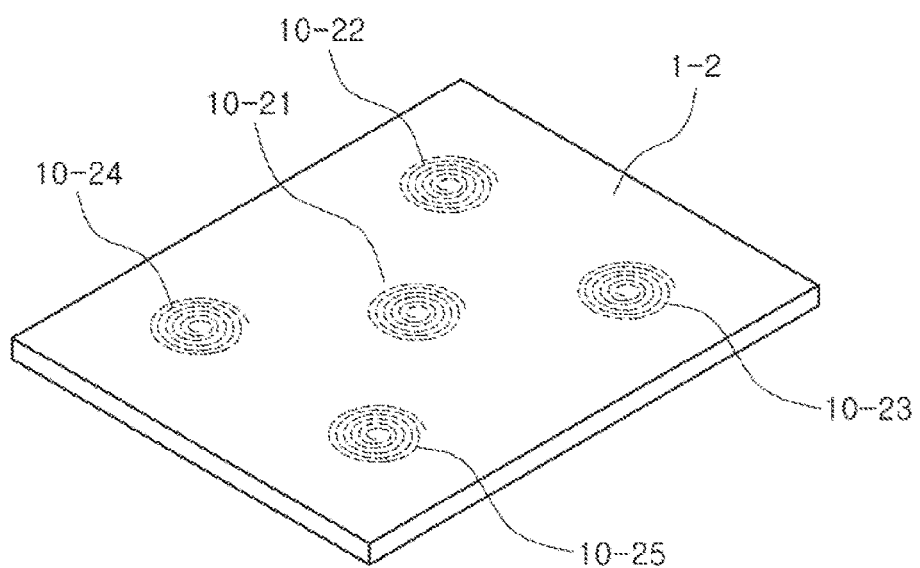

FIGS. 2 and 3 illustrate an exterior of a wireless power transmitter according to an embodiment.

As illustrated in FIG. 2, a wireless power transmitter 1-1, according to an embodiment, includes, as an example, one power transmitting coil 10-1. Alternatively, as illustrated in FIG. 3, a wireless power transmitter 1-2 according to an embodiment includes a plurality of power transmitting coils 10-21 to 10-25.

Figure 4:
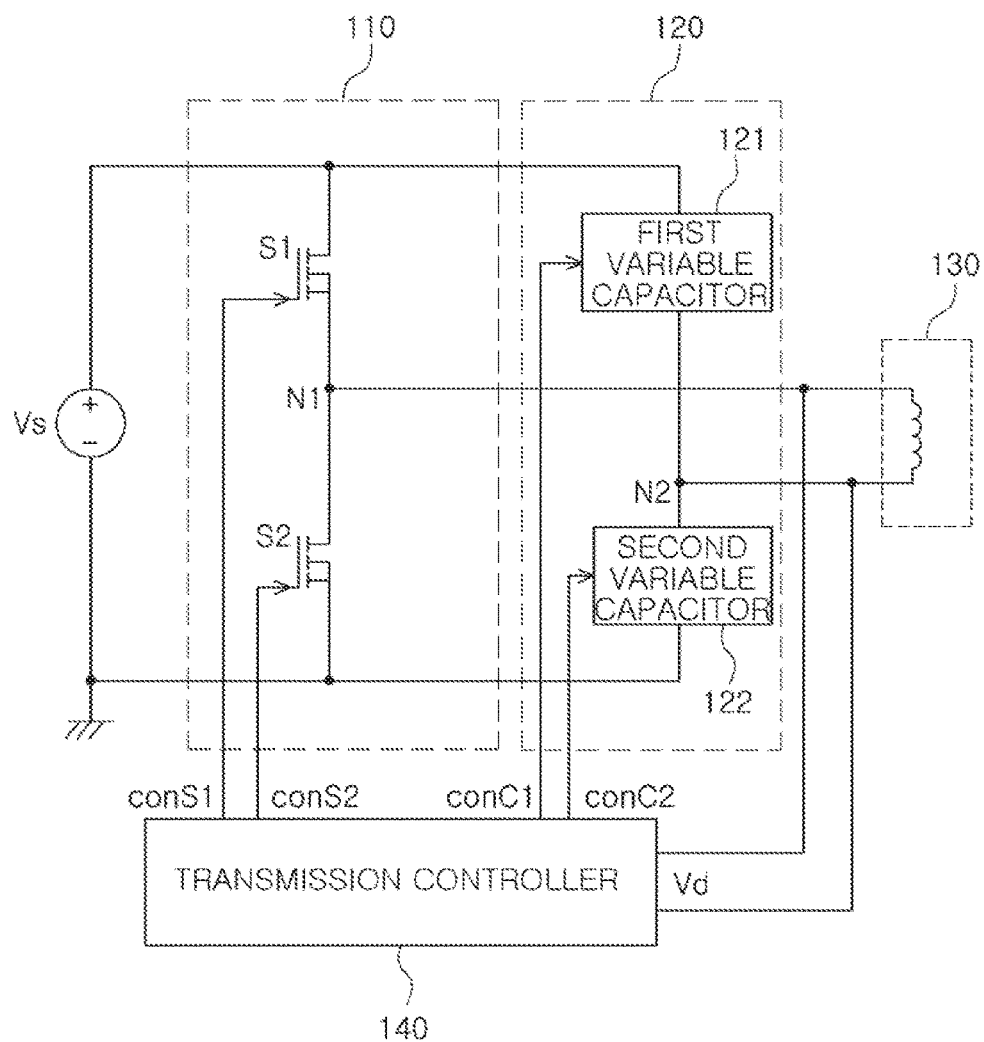
FIG. 4 is a block diagram schematically illustrating a configuration of a wireless power transmitter according to an embodiment.

FIG. 4 is a block diagram schematically illustrating a configuration of a wireless power transmitter, according to an embodiment. A wireless power transmitter, according to an embodiment, includes a converter 110, a variable capacitance circuit 120, a power transmitting coil 130, and a transmission controller 140.

The wireless power transmitter, according to an embodiment, receives a source voltage Vs to wireless transmit power. The source voltage Vs is a direct current (DC) voltage, supplied from the battery, and/or from an adaptor that receives an AC voltage to supply the source voltage Vs.

The converter 110 generates the AC voltage between a first node N1 and a second node N2 in response to transmission control signals conS1 and conS2. The converter 110 includes, for example, a first switch element S1 connected between a terminal to which the source voltage Vs is applied and the first node N1, and turned-on/off in response to a first transmission control signal conS1, and a second switch element S2 connected between the first node N1 and a ground, and turned-on/off in response to a second transmission control signal conS2. An operating frequency at which the converter 110 is operated is determined by frequencies of the transmission control signals conS1 and conS2.

The variable capacitance circuit 120 varies transmission capacitance that determines the resonance frequency in response to capacitance control signals conC1 and conC2. The variable capacitance circuit 120 includes, for example, a first variable capacitor 121 connected between the terminal to which the source voltage Vs is applied and the second node N2, and varying capacitance in response to a first capacitance control signal conC1, and a second variable capacitor 122 connected between the second node N2 and the ground, and varying capacitance in response to a second capacitance control signal conC2.

The power transmitting coil 130 receives the AC voltage output from the converter 110 to wirelessly transmit power. For example, the power transmitting coil 130 wirelessly transmits power by a method of changing a magnetic field around the power transmitting coil 130 by the received AC voltage. That is, in a case in which the AC voltage is applied to the power transmitting coil 130, the magnetic field around the power transmitting coil 130 is changed in a time-varying manner, and in a case in which the power receiving coil is moved within a predetermined region, induced electromotive force may be generated from the power receiving coil according to the change of the magnetic field. By the above-mentioned method, power is wirelessly transmitted.

The power transmitting coil 130 is connected, for example, between the first node N1 and the second node N2. In addition, the power transmitting coil 130 is coupled to the variable capacitance circuit 120 to determine or establish the resonance frequency.

The transmission controller 140 outputs the transmission control signals conS1 and conS2 to control the converter 110, and outputs the capacitance control signals conC1 and conC2 to adjust the capacitance of the variable capacitance circuit 120. In addition, the transmission controller 140 detects a voltage Vd across the power transmitting coil 130.

The transmission controller 140 determines whether or not the wireless power receiver is present based on the voltage Vd. For example, the transmission controller 140 performs a first sensing operation of controlling the converter 110 so that the power is wirelessly transmitted at an initial operating frequency for a predetermined periodic time, and determines whether or not the wireless power receiver is present based on magnitude of the voltage Vd. In this case, the transmission controller 140 determines that the wireless power receiver is present when a difference between a reference voltage (i.e., a voltage across the power transmitting coil 130 when the wireless power receiver is not present) and the detected voltage Vd is a reference value or more. The reference voltage (i.e., a voltage across the power transmitting coil 130 when the wireless power receiver is not present) is pre-stored or may be calculated and stored in the field. In addition, the stored reference voltage may also be updated later by an appropriate algorithm. In addition, the reference voltage (i.e., a voltage across the power transmitting coil 130 when the wireless power receiver is not present) may also have different values depending on the operating frequency or the resonance frequency of the converter 110. The above-mentioned first sensing operation may be similar to an analog ping operation in a wireless power consortium (WPC) standard.

In addition, the transmission controller 140 performs a second sensing operation of determining whether or not the wireless power receiver is present by controlling the converter 110 so that the power is wirelessly transmitted for a predetermined time, and determining whether or not a standard data packet is received from the wireless power receiver within the defined time based on the voltage Vd. When it is determined that the wireless power receiver is present by performing the first sensing operation, the transmission controller 140 performs the second sensing operation. The second sensing operation may be similar to a digital ping operation in the wireless power consortium (WPC) standard.

In addition, the transmission controller 140 determines whether or not the wireless power receiver is present and performs an optimization operation of finding an optimized resonance point according to a distance between the wireless power transmitter and the wireless power receiver and relative positions of the wireless power transmitter and the wireless power receiver, and increasing a voltage gain at the resonance point as needed, at the same time.

According to one or more embodiments, the transmission controller 140 performs the optimization operation before performing the second sensing operation. That is, the transmission controller 140 simultaneously performs the first sensing operation and the optimization operation. By performing the optimization operation before performing the second sensing operation, the distance between the wireless power receiver and the wireless power transmitter in which the wireless power transmission may be performed is increased.

In addition, the transmission controller 140 performs the second sensing operation to confirm that the wireless power receiver is present. Accordingly, the transmission controller 140 also performs the optimization operation after starting the power transmission. The transmission controller 140 is operated as described above, whereby the power transmission is performed in a more optimal state.

A detailed operation method of the transmission controller 140 is described below with reference to FIGS. 10 and 11.

In a case in which the power transmitting coil is plural as illustrated in FIG. 3, the converter 110, the variable capacitance circuit 120, and the transmission controller 140 of FIG. 4 may also be plural so as to correspond to each of the plurality of coils, a switch unit selectively connecting the converter 110, the variable capacitance circuit 120, and the transmission controller 140 to each of the plurality of coils may be further provided, and the transmission controller 140 may also be configured to control the switch unit.

The transmission controller 140, according to one or more embodiments, includes at least one processing unit and a memory. Here, the processing unit includes, for example, a central processing unit (CPU), a graphic processing unit (GPU), a microprocessor, an application specific integrated circuit (ASIC), field programmable gate arrays (FPGA), or other suitable logic, and may have a plurality of cores. The memory may be a volatile memory (e.g., a random access memory (RAM)), a non-volatile memory (e.g., a read only memory (ROM), a flash memory), other suitable memory, or a combination thereof. A program for performing the method for wirelessly transmitting power, according to an embodiment, may be loaded on the memory.

In addition, according to one or more embodiments, the transmission controller 140 includes additional storage. The storage may include magnetic storage, optical storage, or the like, but is not limited thereto. A computer-readable instruction for implementing the method for wirelessly transmitting power according to an embodiment is stored in the storage, and other computer-readable instructions for implementing an operation system, an application program, and the like may also be stored in the storage. The computer-readable instructions stored in the storage are loaded on the memory for execution by the processing unit.

In addition, the converter 110 and the transmission controller 140 may be implemented as one integrated circuit (IC), and the variable capacitance circuit 120 may be implemented as a module separate from the integrated circuit. In this case, the integrated circuit (IC) may also be implemented to satisfy any one of various standards for the wireless power transmission.

Figure 5:
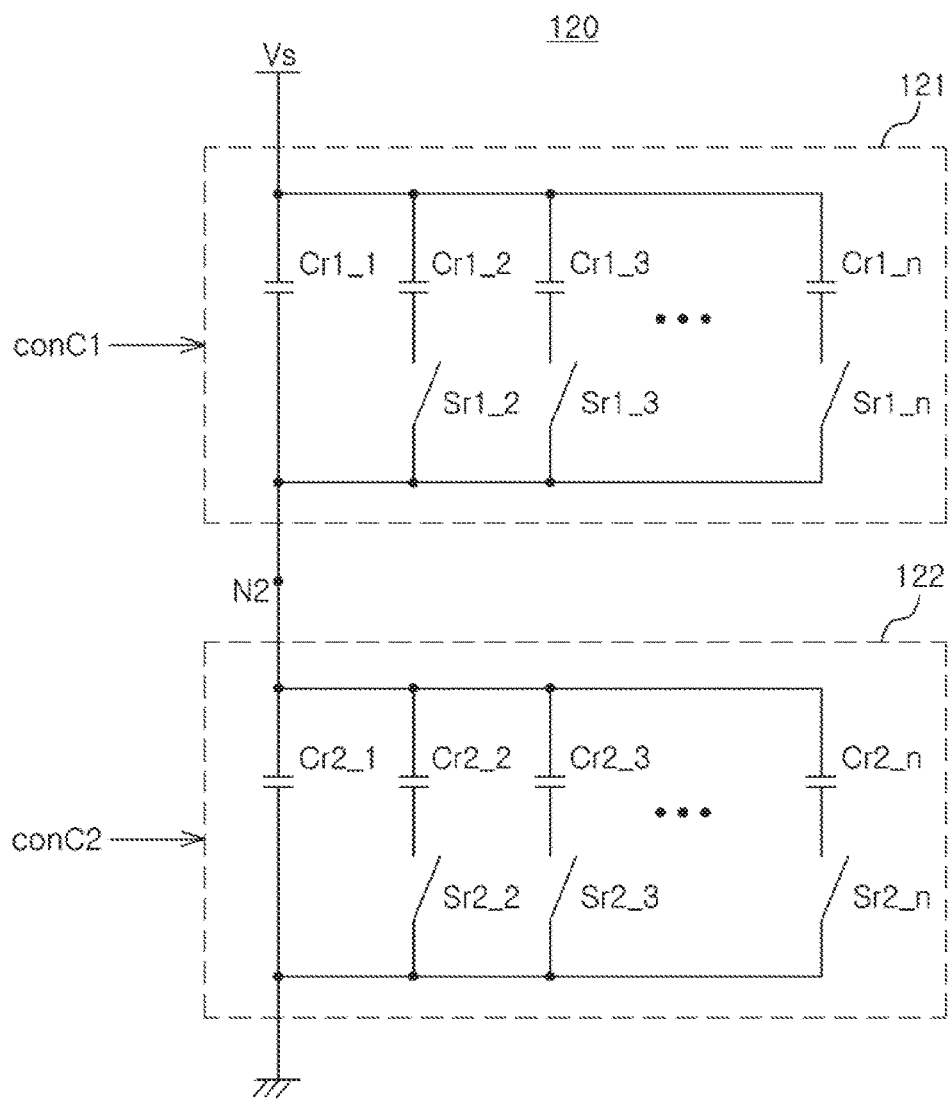
FIG. 5 schematically illustrates a configuration of an example of a variable capacitance circuit of the wireless power transmitter such as the one illustrated in FIG. 4.

FIG. 5 schematically illustrates a configuration of an example of a variable capacitance circuit of the wireless power transmitter according to an embodiment illustrated in FIG. 4 or other such wireless power transmitter. The variable capacitance circuit of the wireless power transmitter according to an embodiment includes the first variable capacitor 121 and the second variable capacitor 122.

The first variable capacitor 121 is connected between the terminal to which the source voltage Vs is applied and the second node N2, and have the capacitance varied in response to the first capacitance control signal conC1. The first variable capacitor 121 includes a first resonance capacitor Cr1_1 connected between the terminal to which the source voltage Vs is applied and the second node N2, one or more second resonance capacitors Cr1_2 to Cr1_$n$, each having one end connected to the terminal to which the source voltage Vs is applied, and one or more first resonance switches Sr1_2 to Sr1_$n$ each connected between the other end of each of one or more second resonance capacitors Cr1_2 to Cr1_$n$ and the second node N2 and turned-on/off in response to the first capacitance control signal conC1. In a case in which the first resonance switches Sr1_2 to Sr1_$n$ are plural, the first capacitance control signal conC1 may include a plurality of bits to collectively provide a plurality of discrete values corresponding to or including at least as many switches as provided.

The second variable capacitor 122 is connected between the second node N2 and the ground, and has the capacitance varied in response to the second capacitance control signal conC2. The second variable capacitor 122 includes a third resonance capacitor Cr2_1 connected between the second node N2 and the ground, one or more fourth resonance capacitors Cr2_2 to Cr2_$n$, each having one end connected to the second node N2, and one or more second resonance switches Sr2_2 to Sr2_$n$, each connected between the other end of each of one or more fourth resonance capacitors Cr2_2 to Cr2_$n$ and the ground and turned-on/off in response to the second capacitance control signal conC2. In a case in which the second resonance switches Sr2_2 to Sr2_$n$ are plural, the second capacitance control signal conC2 may include a plurality of bits.

Figure 6:
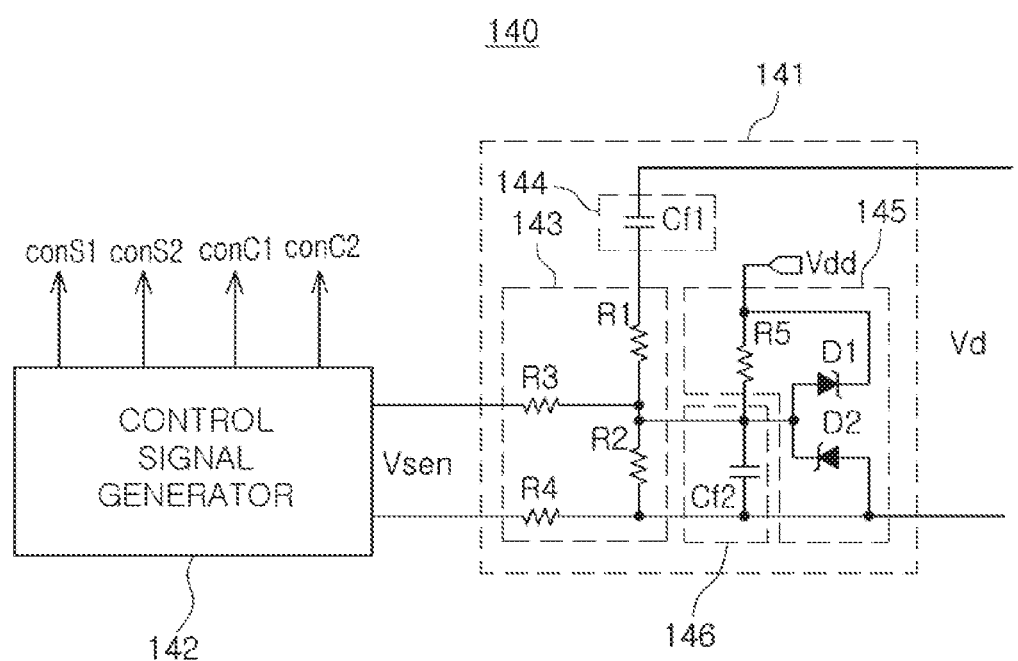
FIG. 6 schematically illustrates a configuration of an example of a transmission controller of the wireless power transmitter such as the one illustrated in FIG. 4.

FIG. 6 schematically illustrates a configuration of an example of a transmission controller of the wireless power transmitter according to an embodiment such as the one illustrated in FIG. 4. The transmission controller of the wireless power transmitter according to an embodiment includes a sensor 141 and a control signal generator 142.

The sensor 141 inputs the voltage Vd across the power transmitting coil 130 (FIG. 4) to output a sensed voltage Vsen to the control signal generator 142. The sensor 141 may appropriately reduce the voltage Vd across the power transmitting coil 130 (FIG. 4) to output the sensed voltage Vsen. The sensor 141, according to an embodiment, includes a voltage distributor 143, an offset remover 144, a DC voltage setter 145, and a filter 146.

The offset remover 144 includes a first filtering capacitor Cf1, and removes a DC offset from the voltage Vd across the power receiving coil and transfers the voltage from which the DC offset is removed to the voltage distributor 143.

The voltage distributor 143 divides the input voltage to output the sensed voltage Vsen. The voltage distributor 143 includes a first resistor R1 and a second resistor R2 which are connected in series with each other. The voltage distributor 143 also includes, according to one or more embodiments, a third resistor R3 connected between a connection node of the first resistor R1 and the second resistor R2 and the control signal generator 142, and a fourth resistor R4 connected between one end of the second resistor R2 and the control signal generator 142.

The DC voltage setter 145 allows the sensed voltage Vsen to have a value within a constant DC voltage range. The DC voltage setter 145 includes a resistor R5 connected between a terminal to which a set voltage Vdd is applied and the connection node of the first resistor R1 and the second resistor R2, a first diode D1 connected between a terminal to which a set voltage Vdd is applied and the connection node of the first resistor R1 and the second resistor R2, and a second diode D2 connected between the connection node of the first resistor R1 and the second resistor R2, and a ground.

The filter 146 removes a noise component. The noise component may be a high frequency component at a voltage of the connection node of the first resistor R1 and the second resistor R2. The filter 146 includes a second filtering capacitor Cf2 connected between the connection node of the first resistor R1 and the second resistor R2, and the ground.

Figure 7:
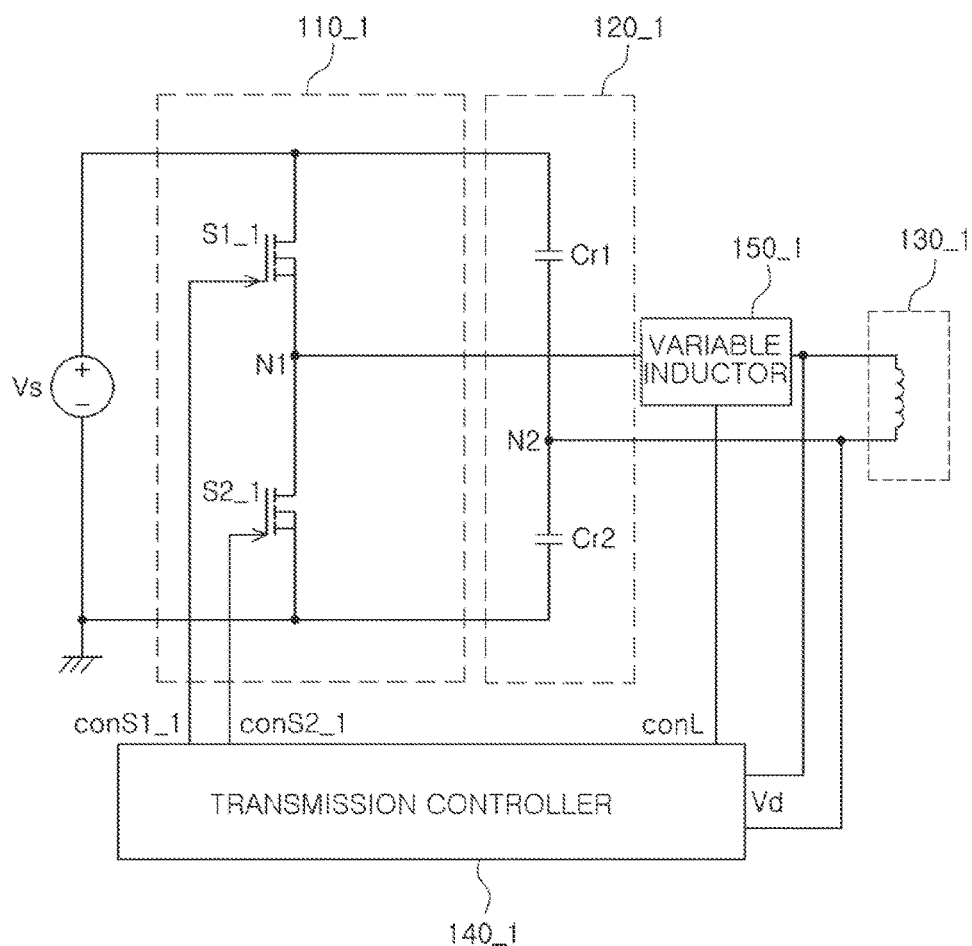
FIG. 7 is a block diagram schematically illustrating a wireless power transmitter according to an embodiment.

FIG. 7 is a block diagram schematically illustrating a wireless power transmitter according to an embodiment. The wireless power transmitter according to an embodiment includes a converter 110_1, a resonance capacitor circuit 120_1, a power transmitting coil 130_1, a transmission controller 140_1, and a variable inductor 150_1.

An operation of the wireless power transmitter according to an embodiment of FIG. 7 is similar to the operation of the wireless power transmitter according to an embodiment illustrated in FIG. 4.

That is, functions, configurations, and operations of the converter 110_1 and the power transmitting coil 130_1 illustrated in FIG. 7 are similar to the functions, the configurations, and the operations of the converter 110 and the power transmitting coil 130 illustrated in FIG. 4.

The transmission controller 140_1 illustrated in FIG. 7 performs similar functions, has similar configuration, and operates similar to those of the transmission controller 140 of FIG. 4 except that it outputs an inductance control signal conL instead of (or in addition to) the capacitance control signals conC1 and conC2 (FIG. 7). While the variable capacitance is primarily shown in FIGS. 4-6 and the variable inductance resonance control measures are primarily shown separately in FIG. 7, according to one or more embodiments, they may be combined as a variable inductance and capacitance as would be known to one of skill in the art after gaining a thorough understanding of the detailed disclosure. Moreover, a reactance circuit may be employed as would be known to one of skill in the art after gaining a thorough understanding of the detailed disclosure.

The resonance capacitor circuit 120_1 determines the resonance frequency together with the variable inductor 150_1 and the power transmitting coil 130_1. The resonance capacitor circuit 120_1 includes a first resonance capacitor Cr1 connected between the terminal to which the source voltage Vs is applied and the second node N2, and a second resonance capacitor Cr2 connected between the second node N2 and the ground.

The variable inductor 150_1 has inductance varied in response to the inductance control signal conL, and determines or establishes the resonance frequency together with the resonance capacitor circuit 120_1 and the power transmitting coil 130_1. The variable inductor 150_1 is connected between the first node N1 and the power transmitting coil 130_1.

According to one or more embodiments, the converter 110_1 and the transmission controller 140_1 are implemented as one integrated circuit (IC), and the variable inductor 150_1 is implemented as a module separate from the integrated circuit. In this case, the integrated circuit (IC) may also be implemented to satisfy any one of various standards for the wireless power transmission.

Figure 8:
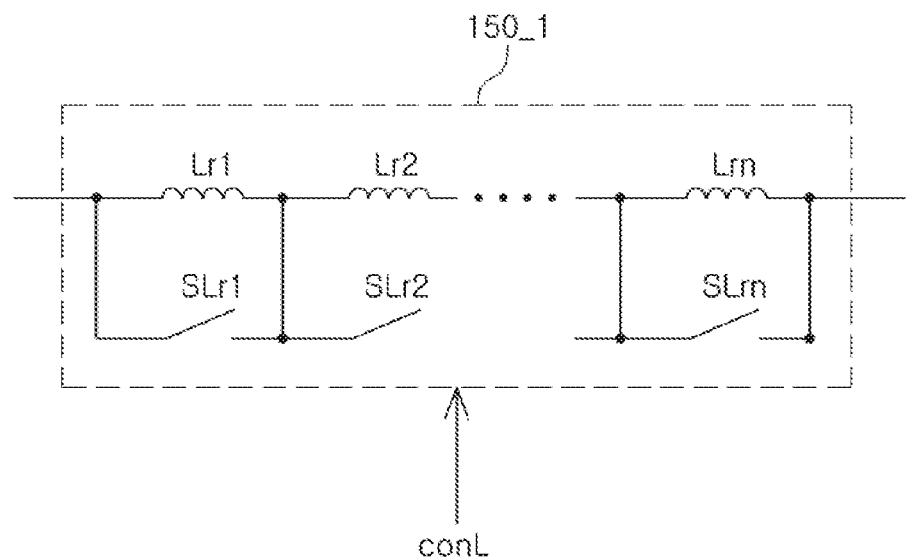
FIG. 8 schematically illustrates a configuration of an example of a variable inductor of a wireless power transmitter, such as the one illustrated in FIG. 7.

FIG. 8 schematically illustrates a configuration of an example of a variable inductor of the wireless power transmitter according to an embodiment such as the one illustrated in FIG. 7.

The variable inductor 150_1 includes one or more resonance inductors Lr1 to Lrn which are connected in series between the first node N1 (FIG. 8) and one end of the power transmitting coil 130_1 (FIG. 8), and one or more resonance switches SLr1 to SLrn which are connected in parallel to one or more resonance inductors Lr1 to Lrn, respectively, and are turned-on/off in response to the inductance control signal conL. In a case in which the resonance switches SLr1 to SLrn are plural, the inductance control signal conL may include a plurality of bits.

Inductance of the variable inductor 150_1 may be determined or established according to states of the resonance switches SLr1 to SLrn. For example, if only the resonance switch SLr1 is turned-on, and the remaining resonance switches SLr2 to SLrn are in a turned-off state, the variable inductor 150_1 may equal to a case in which only the resonance inductor Lr1 is actuated. Therefore, the inductance of the variable inductor 150_1 is the same as the resonance inductor Lr1. That is, depending on the states of the resonance switches SLr1 to SLrn, the inductance of the variable inductor 150_1 may be adaptively set as an inductance of one selected inductor or overall inductance of a plurality of selected inductors of one or more resonance inductors Lr1 to Lrn.

Figure 9:
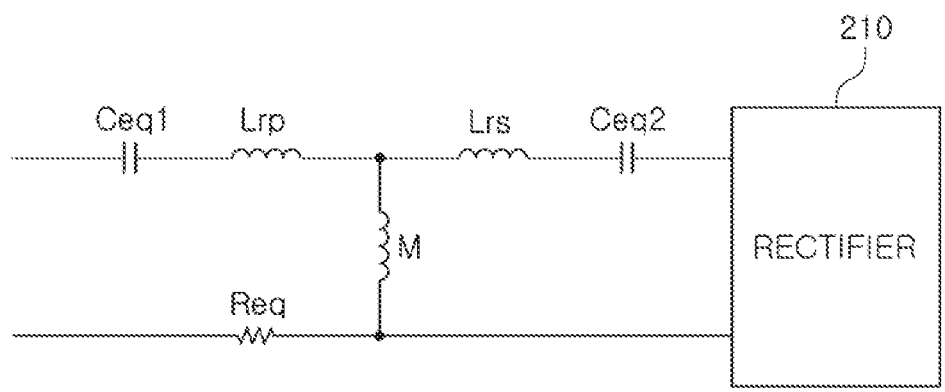
FIG. 9 schematically illustrates an equivalent circuit of a power transmitting coil of a wireless power transmitter and a wireless power receiver in a case in which the wireless power receiver is adjacent to the wireless power transmitter according to an embodiment such as that illustrated in, for example, FIG. 4 or 7.

FIG. 9 schematically illustrates an equivalent circuit of a power transmitting coil of the wireless power transmitter and a wireless power receiver in a case in which the wireless power receiver is adjacent to the wireless power transmitter according to an embodiment such as illustrated in FIG. 4 or 7.

In FIG. 9, Ceq1 is an equivalent capacitor having capacitance of the resonance capacitor of the wireless power transmitter establishing the resonance frequency, Lrp is an equivalent inductor having leakage inductance of the power transmitting coil (or the power transmitting coil and the resonance inductor) of the wireless power transmitter, M is an equivalent inductor having mutual inductance between the power transmitting coil of the wireless power transmitter and the power receiving coil of the wireless power receiver, Lrs is an equivalent inductor having leakage inductance of the power receiving coil of the wireless power receiver, and Ceq2 is an equivalent capacitor having equivalent capacitance of the wireless power receiver. A rectifier 210 of FIG. 9 illustrates a circuit portion including a rectifier, a load, and the like of the wireless power receiver.

In the equivalent circuit of FIG. 9, in a case in which a distance between the wireless power transmitter and the wireless power receiver is changed, or a relative position or orientation between the power transmitting coil and the power receiving coil is changed, all of the inductances of Lrp, M, and Lrs may be changed. Specifically, in a case in which the distance between the wireless power transmitter and the wireless power receiver, that is, a distance between the power transmitting coil and the power receiving coil is increased, the inductances of Lrp and Lrs are increased, and the inductance of M is decreased, thereby decreasing a voltage transfer gain.

Figure 10:
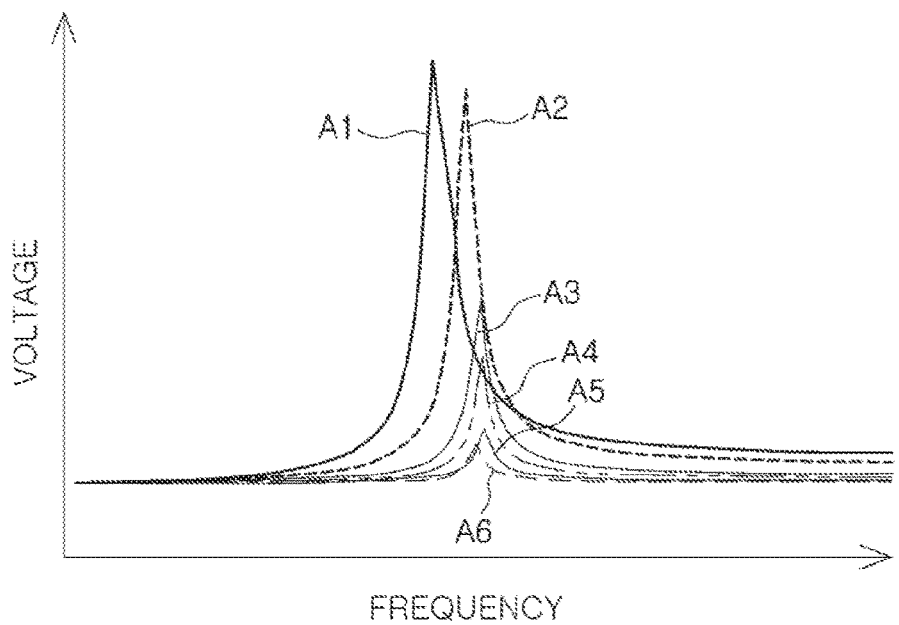
FIG. 10 is a diagram illustrating a change in a voltage gain according to a distance between a power transmitting coil of the wireless power transmitter and a power receiving coil of a wireless power receiver.

FIG. 10 is a diagram illustrating a change in a voltage gain according to a distance between the transmitting coil of the wireless power transmitter and a power receiving coil of the wireless power receiver.

A horizontal axis of FIG. 10 represents an operating frequency (e.g., the operating frequency of the converter, such as the embodiment presented in FIG. 4 or 7), and a vertical axis may be a voltage of the wireless power receiver, for example, a voltage across the power receiving coil or an output voltage of the rectifier of the wireless power receiver.

FIG. 10 illustrates a case in which the distance between the power transmitting coil of the wireless power transmitter and the power receiving coil of the wireless power receiver is increased in order of A1, A2, A3, A4, A5, and A6.

Since magnitude of the source voltage Vs is fixed, a high voltage of the vertical axis of FIG. 10 means that the voltage gain is high. Conversely, where the magnitude of the voltage on the vertical axis is low, the voltage gain is relatively low. For example, A1 and A2 may be considered high, while A3-A6 may be considered to be low. Low, for example, may be lower than about half of the source voltage Vs.

As illustrated in FIG. 10, as the distance between the power transmitting coil of the wireless power transmitter and the power receiving coil of the wireless power receiver is increased, the voltage gain of a resonance point (a peak point) may also be decreased, and the resonance frequency may be gradually moved to a higher frequency. Such characteristics equally occur even in a case in which a position or orientation mismatch between the power transmitting coil of the wireless power transmitter and the power receiving coil of the wireless power receiver is increased. That is, to substantially maximize voltage gain at different distances and orientations, the frequency should be adaptively adjusted.

Figure 11:
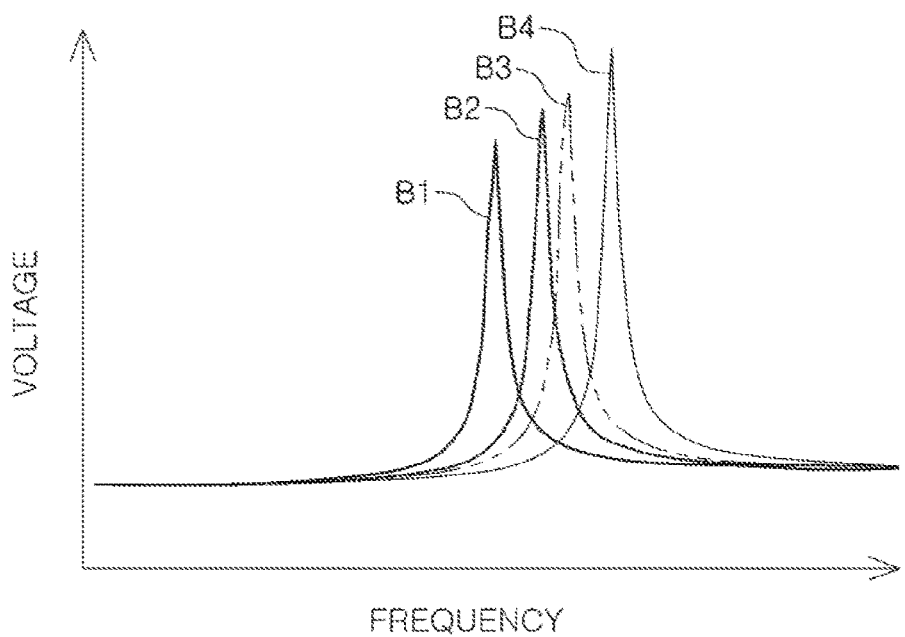
FIG. 11 is a diagram illustrating a change in a voltage gain according to capacitance of a resonance capacitor of the wireless power transmitter.

FIG. 11 is a diagram illustrating a change in a voltage gain according to capacitance of a resonance capacitor of the wireless power transmitter.

A horizontal axis of FIG. 11 represents an operating frequency (e.g., the operating frequency of the converter such as in FIG. 4 or 7), and a vertical axis is a voltage of the wireless power receiver, for example, a voltage across the power receiving coil or an output voltage of the rectifier of the wireless power receiver. FIG. 11 illustrates that the capacitance of the resonance capacitor of the wireless power transmitter is decreased in order of B1, B2, B3, and B4.

As illustrated in FIG. 11, in a case in which the capacitance of the resonance capacitor is decreased, the resonance frequency may be increased, and in this case, the voltage gain of the resonance point (the peak point) may tend to be increased.

Figure 12:
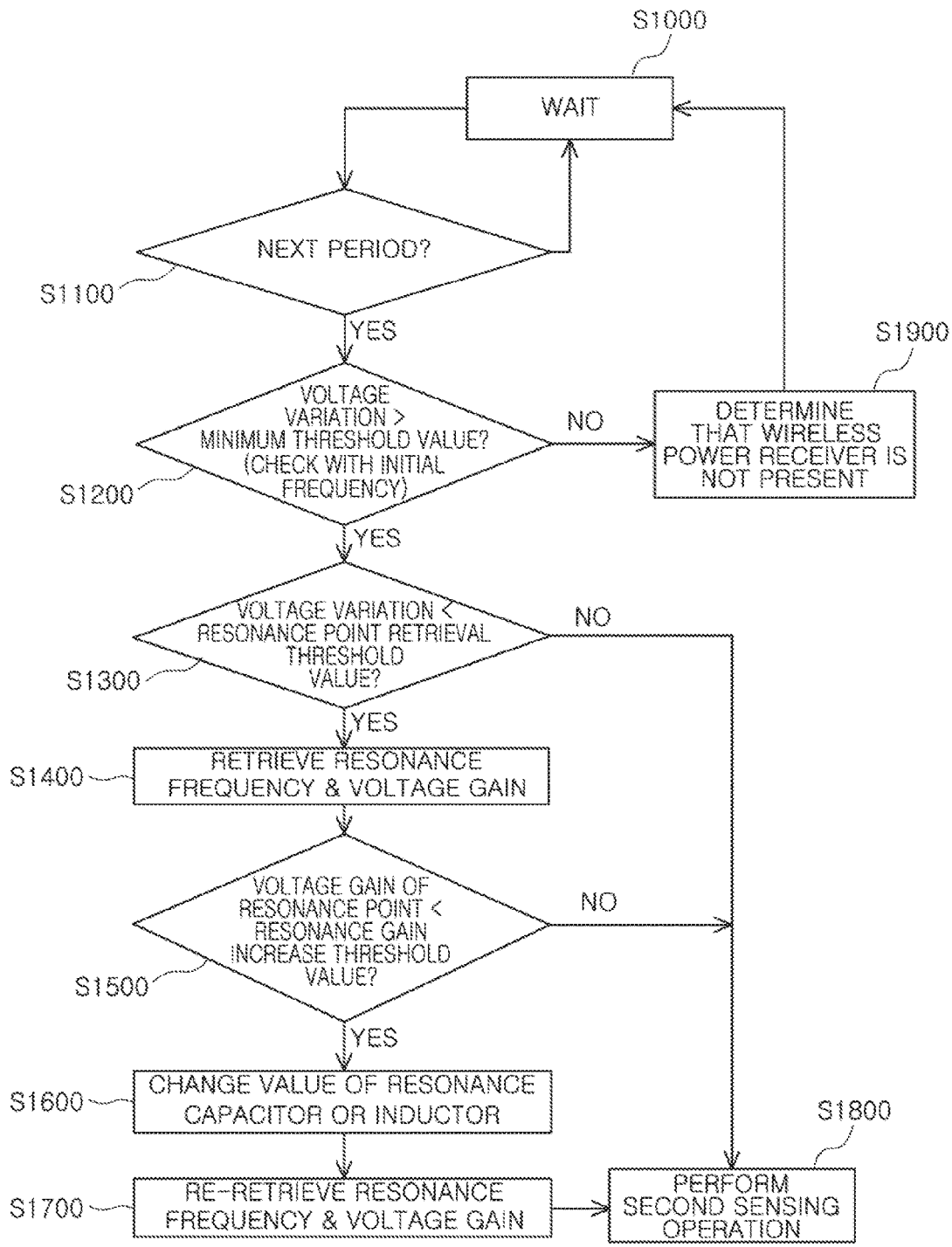
FIG. 12 is an operation flowchart illustrating a method for wirelessly transmitting power according to an embodiment.

FIG. 12 is an operation flowchart illustrating a method for wirelessly transmitting power according to an embodiment.

First, it is determined whether a period at which a first sensing operation is to be performed arrives (S1100). The first sensing operation may be similar to an analog ping operation in a wireless power consortium (WPC) standard.

As a result of the determination in S1100, if it is determined that the period at which the first sensing operation is to be performed does not arrive, a wait or NULL operation is performed until the period at which the first sensing operation is to be performed arrives (S1000).

Next, if the period at which the first sensing operation is to be performed arrives, it is determined whether or not a voltage variation is greater than a minimum threshold value by performing the first sensing operation (S1200).

For example, the transmission controller 140 (FIG. 4) or 140_1 (FIG. 7) performs a control operation so that the converter 110 (FIG. 4) or 110_1 (FIG. 7) is operated at an initial operating frequency by applying the transmission control signals conS1 and conS2 (FIG. 4) or conS1_1 and conS2_1 (FIG. 7) having the initial operating frequency to the converter 110 (FIG. 4) or 110_1 (FIG. 7) so that the power is wirelessly transmitted for a predetermined time, and then compares a difference (i.e., the voltage variation) between a reference voltage (i.e., a voltage across the power transmitting coil 130 (FIG. 4) or 130_1 (FIG. 7) when the wireless power receiver is not present) and the detected voltage Vd with a minimum threshold value. The reference voltage and the minimum threshold value, according to an embodiment, are pre-stored. In addition, the initial operating frequency is also preset. For example, the initial operating frequency is determined so that the resonance point is in the vicinity of a minimum frequency, when the distance between the power transmitting coil of the wireless power transmitter and the power receiving coil of the wireless power receiver is a short distance. For example, in the wireless power transmitting system according to a wireless power consortium (WPC) standard, the initial operating frequency is about 90 to about 120 kHz.

As a result of the determination in S1200, if it is determined that the voltage variation is the minimum threshold value or less, it is determined that the wireless power receiver is not present (S1900), and the wait is performed until the period at which the first sensing operation is to be performed again arrives (S1000).

The minimum threshold value is determined, for example, by magnitude of the voltage variation measured in several situations according to the distance between the wireless power transmitter and the wireless power receiver and a degree of mismatch of the power transmitting coil and the power receiving coil which are targeted at the time of designing the system, and may be set to, e.g. a very low value. For example, the minimum threshold value may be a voltage variation of when the distance between the wireless power transmitter and the wireless power receiver is the maximum voltage variation within a range in which the power may be effectively transmitted to the wireless power receiver from the wireless power transmitter.

The minimum threshold value is, for example, established as a threshold value for magnitude of a voltage instead of the voltage variation. For example, the minimum threshold value may be a voltage across the power transmitting coil of the wireless power transmitter of when the distance between the wireless power transmitter and the wireless power receiver is the maximum voltage variation within a range in which the power may be effectively transmitted to the wireless power receiver from the wireless power transmitter, and may also have magnitude similar to the voltage across the power transmitting coil of the wireless power transmitter of when the wireless power receiver is not present.

According to an embodiment, in a case in which the minimum threshold value is set to the voltage variation, the minimum threshold value is set to a smaller value. (In a case in which the minimum threshold value is set to the magnitude of the voltage, the minimum threshold value may be set to a larger value). That is, according to an embodiment, even in a case in which the wireless power receiver is present at position at which the wireless power transmission does not conventionally start, the wireless power transmission may be performed.

In S1200, instead of the voltage variation, the detected voltage Vd, that is, the magnitude of the voltage across the power transmitting coil may also be used. For example, it may also be determined whether or not the wireless power receiver is present by comparing the magnitude of the voltage across the power transmitting coil with a predetermined threshold value. In this case, if the magnitude of the voltage across the power transmitting coil is greater than the predetermined threshold value, it may be determined that the wireless power receiver is not present, and if the magnitude of the voltage across the power transmitting coil is smaller than the predetermined threshold value, it may be determined that the wireless power receiver is present.

As the result of the determination in S1200, if it is determined that the voltage variation is greater than the minimum threshold value, it is determined whether or not the voltage variation is lower than a resonance point retrieval threshold value (S1300). The resonance point retrieval threshold value, value greater than the minimum threshold value, may be the voltage variation of a case in which the distance between the wireless power receiver and the wireless power transmitter is close to such an extent as not to need to retrieve the resonance point, or adjust the capacitance of the resonance capacitor or the inductance of the resonance inductor.

In addition, in S1300, the converter 110 (FIG. 4) or 110_1 (FIG. 7) may be operated at the initial operating frequency.

As the result of the determination in S1300, if it is determined that the voltage variation is lower than the resonance point retrieval threshold value, a resonance point retrieval operation is performed (S1400). Specifically, the voltage variation is detected at various operation frequencies while changing the operating frequency (i.e., the frequency at which the converter 110 (FIG. 4) or 110_1 (FIG. 7) is operated), and the operating frequency at which the voltage variation is the maximum voltage variation is detected as the resonance point. As a method for changing an operating frequency, a method for sequentially increasing the operating frequency from the initial operating frequency to a retrieval end frequency is also selected, and a method for changing an operating frequency using, for example, a general maximum value retrieval algorithm between the initial operating frequency and the retrieval end frequency is also selected. Alternatively, the operating frequency of which the voltage variation is the maximum voltage variation value is retrieved while increasing the operating frequency from the initial operating frequency in a predetermined unit, and is stored as the maximum voltage variation value. Thereafter, if the maximum voltage variation value of the voltage variation is not updated even in a case in which the operating frequency is increased a few more times, the resonance frequency retrieval operation may end. The retrieval end frequency, the maximum voltage variation frequency at which the converter 110 (FIG. 4) or 110_1 (FIG. 7) may be operated, may have different values according to various standards. For example, according to wireless power consortium (WPC) standard, the retrieval end frequency may be about 200 kHz.

In S1300, instead of the voltage variation, the detected voltage Vd, that is, the magnitude of the voltage across the power transmitting coil, according to one or more embodiments is also used in lieu or in supplement. For example, the voltage Vd may be detected at various operation frequencies while changing the operating frequency (i.e., the frequency at which the converter 110 (FIG. 4) or 110_1 (FIG. 7) is operated), and the operating frequency at which the magnitude of the voltage Vd is the maximum voltage variation is detected as the resonance point.

Next, it may be determined whether or not the voltage variation at the resonance point retrieved in S1400 is smaller than a resonance gain increase threshold value (S1500). The resonance gain increase threshold value may be a value greater than the minimum threshold value and is lower than the resonance point retrieval threshold value. The resonance gain increase threshold value may be a threshold value determining whether or not the resonance point should be changed by adjusting the capacitance of the resonance capacitor or the inductance of the resonance inductor because the voltage gain at the resonance point is also not sufficient.

As a result of the determination in S1500, if the voltage variation at the resonance point is smaller than the resonance gain increase threshold value, transmission impedance of the wireless power transmitter is adjusted (S1600), and the resonance frequency retrieval operation is again performed (S1700).

In S1600, the capacitance of a transmission side is adjusted (see FIGS. 4 and 5), and/or the inductance of the transmission side is adjusted (see FIGS. 8 and 9). In addition, in the case in which the capacitance of the transmission side and/or the inductance of the transmission side are adjusted, the capacitance and/or the inductance is, according to one or more embodiments, adjusted to minimum capacitance and/or minimum inductance. The minimum capacitance and the minimum inductance are set so that the system coincides with a standard in which the resonance frequency is defined. For example, according to a wireless power consortium (WPC) standard, the minimum capacitance and the minimum inductance are adaptively set so that the resonance frequency of the wireless power transmitting system is not out of an operating frequency range (e.g., about 110 to about 205 kHz) of the WPC standard when the wireless power transmitting system is operated.

The resonance frequency retrieval operation in S1700, according to one or more embodiments, is the same as the resonance frequency retrieval operation in S1400. However, a change range of the operating frequency in S1700 is between the frequency of the resonance point retrieved in S1400 and the retrieval end frequency.

As the result of the determination in S1300, if it is determined that the voltage variation is equal to the resonance point retrieval threshold value or more, or as the result of the determination in S1500, if it is determined that the voltage gain of the resonance point is the resonance gain increase threshold value or more, it is determined that the wireless power receiver is present and a second sensing operation is performed (S1800). In addition, even after S1700 is performed, the second sensing operation is performed (S1800). As described above, the second sensing operation is an operation of determining whether or not the wireless power receiver is present by controlling the converter 110 so that the power is wirelessly transmitted for a predetermined time, and determining whether or not a standard data packet is received from the wireless power receiver within the defined time based on the voltage Vd. The second sensing operation, according to one or more embodiments, is similar to a digital ping operation in the wireless power consortium (WPC) standard.

As the result of performing the second sensing operation, if it is determined that the wireless power receiver is present, power for charging is transmitted (or continues to be transmitted) from the wireless power transmitter to the wireless power receiver. According to one or more embodiments, the operations illustrated in FIG. 12 are performed before starting the transmission of the power for charging from the wireless power transmitter to the wireless power receiver.

In FIG. 12, by performing S1300 to S1800 only in the case in which the voltage variation is the minimum threshold value or more as the result of the determination in S1200, the resonance point retrieval operation and the impedance (and/or capacitance) adjustment operation (which may be unnecessary in some situations) may be prevented where appropriate.

In a case in which a difference between the voltage variation at the resonance point retrieved in S1400 and a voltage variation (e.g., the voltage variation at the initial operating frequency) at a non-resonance point is a threshold variation or less, according to one or more embodiments, it is determined that an object approaching the wireless power transmitter is not the wireless power receiver, but a foreign material, and S1000 and S1100 are performed to wait for another periodic determination of voltage variation at S1200.

In addition, as illustrated in FIG. 3, in the case in which the power transmitting coil is plural, a time of performing the method for wirelessly transmitting power according to an embodiment is shortened by determining the voltage variation at the initial operating frequency for each of the plurality of power transmitting coils, and then performing S1300 to S1800 for the power transmitting coil having the greatest voltage variation.

However, as illustrated in FIG. 3, in the case in which the power transmitting coil is plural, the respective operations of the FIG. 12 are performed for each of the plurality of power transmitting coils.

In addition, although FIG. 12 illustrates a case in which S1000 to S1900 are performed before the second sensing operation is performed, the wireless power transmitter and the method for wirelessly transmitting power, according to an embodiment, may additionally perform all or some of S1000 to S1900 of FIG. 12 even after the second sensing operation is performed. For example, in the middle of transmitting the power to the wireless power transmitter after the second sensing operation is performed, S1300 to S1700 may also be additionally performed.

In addition, by performing the respective operations illustrated in FIG. 12, a start operating frequency of the wireless power transmitter is able to be determined. For example, as the result of the determination in S1300, if the voltage variation is greater than the resonance point retrieval threshold value, the initial operating frequency is determined as the start operating frequency. As the result of the determination in S1500, if the voltage gain of the resonance point is greater than the resonance gain increase threshold value, the start operating frequency is selected in a frequency range (i.e., a frequency range having a difference with the frequency of the resonance point of a predetermined value or less) set by the frequency of the resonance point, and in the case in which S1700 is performed, the start operating frequency is selected in a frequency range set by a frequency of a re-retrieved resonance point. The start operating frequency may be greater than the frequency of the resonance point, that is, the resonance frequency. Thereafter, the second sensing operation (S1800 in FIG. 12) is, according to one or more embodiments, performed while operating the converter 110 (FIG. 4) or 110_1 (FIG. 7) at the start operating frequency.

As the result of performing the second sensing operation, if it is determined that the wireless power receiver is present, the wireless power transmitter wirelessly transmits power because the converter 110 (FIG. 4) or 110_1 (FIG. 7) is operated at the operating frequency. In this case, the operating frequency is varied within a predetermined variable range of a frequency region higher than the frequency of the resonance point. In this case, the operating frequency may have a value greater than the start operating frequency.

Figure 13:
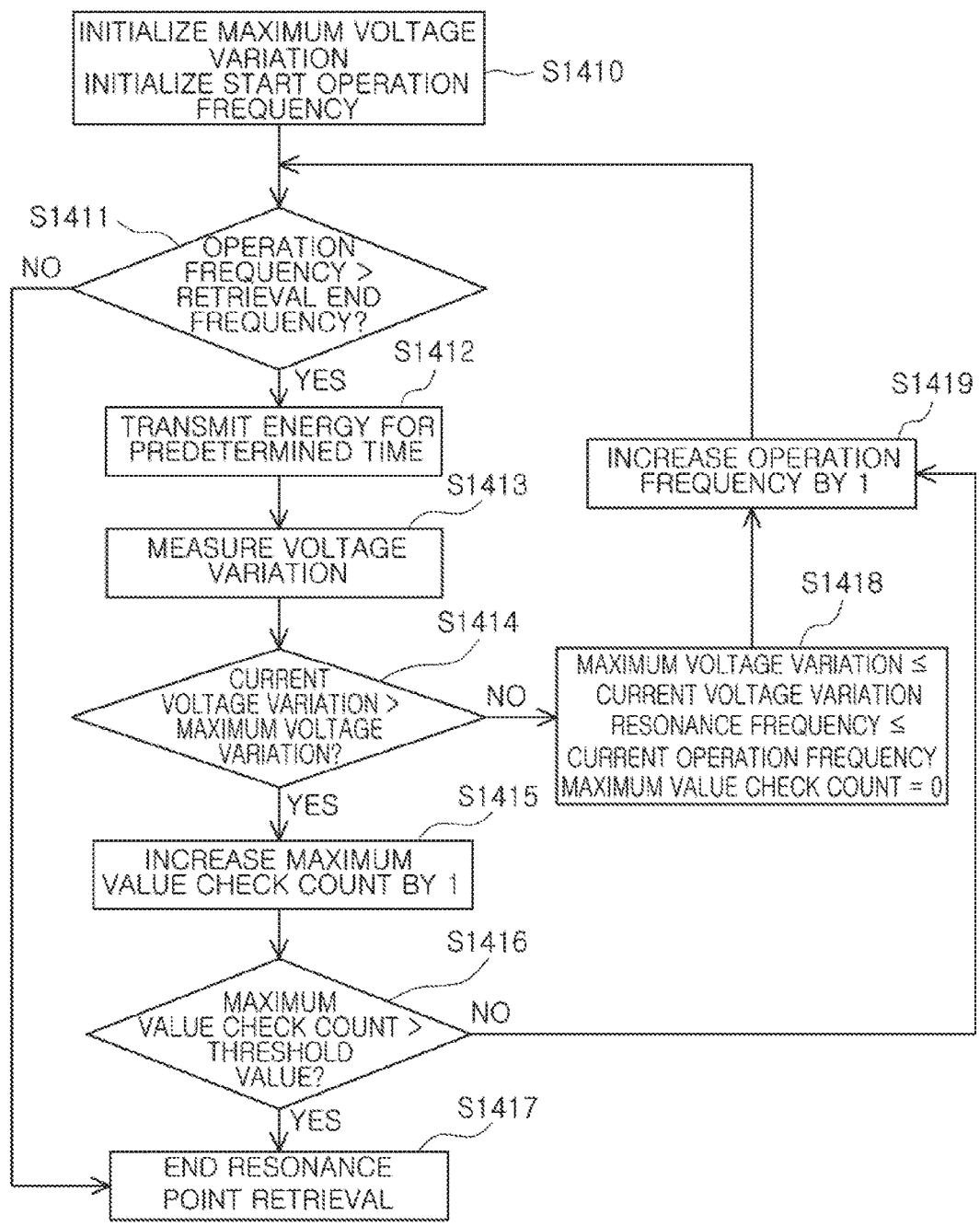
FIG. 13 is an operation flowchart illustrating an example of an operation of retrieving a resonance frequency and a voltage gain in the method for wirelessly transmitting power according to an embodiment such as that illustrated in FIG. 12.

FIG. 13 is an operation flow chart illustrating an example of an operation of retrieving a resonance frequency and a voltage gain in the method for wirelessly transmitting power according to an embodiment, such as the one illustrated in FIG. 12.

First, an initialization operation is performed (S1410). Specifically, the start operating frequency and the maximum voltage variation are initialized. In a case in which the operations in FIG. 13 are performed in S1400 in FIG. 12, the start operating frequency is initialized to the initial operating frequency described in FIG. 12. Alternatively, in a case in which the operations in FIG. 13 are performed in S1700 in FIG. 12, the start operating frequency may also be initialized to the frequency of the resonance point retrieved in S1400 in FIG. 12. In addition, the maximum voltage variation may be initialized to 0.

Next, it is determined whether or not the operating frequency is smaller than the retrieval end frequency (S1411).

As the result of the determination in S1411, if the operating frequency is smaller than the retrieval end frequency, the power is wirelessly transmitted for a predetermined time through the power transmitting coil 130 (FIG. 4) or 130_1 (FIG. 7) (S1412).

Next, the voltage variation is measured (S1413). For example, a difference between a voltage variation of when a stored wireless power receiver is not present and a voltage across the power transmitting coil 130 (FIG. 4) or 130_1 (FIG. 7) measured after S1412 is performed is calculated.

Next, it is determined whether or not a current voltage variation is lower than the stored maximum voltage variation (S1414).

As the result of the determination in S1414, if the current voltage variation is the stored maximum voltage variation or more, the current voltage variation is stored as the maximum voltage variation, a current operating frequency is stored as the resonance frequency, and a maximum value check count is reset to 0 (S1418).

As the result of the determination in S1414, if the current voltage variation is lower than the stored maximum voltage variation, the maximum value check count is increased by 1 (S1415), and it is determined whether or not the maximum value check count is greater than a threshold count value (S1416).

After S1418 is performed, or as the result of the determination in S1416, if it is determined that the maximum value check count is the threshold count value or less, the operating frequency is increased by a unit frequency (S1419), and the method is re-performed from S1411.

As the result of the determination in S1416, if it is determined that the maximum value check count is greater than the threshold value, the resonance point retrieval ends (S1417).

The respective operations illustrated in FIGS. 12 and 13, according to one or more embodiments, are implemented so as to be performed by hardware, a hybrid such as field-programmable gate arrays, firmware or software executing on one or more processors or controllers. In addition, the respective operations illustrated in FIGS. 12 and 13 may be performed by the transmission controller 140 (FIG. 4) or 140_1 (FIG. 7).

As set forth above, according to the embodiments, the wireless power transmitter and the method for wirelessly transmitting power improve the degree of freedom of the transmission distance in which the power is wirelessly transmitted. That is, the transmission distance in which the power is wirelessly transmitted is increased. Thereby, the wireless charging may be possible even for applications or products in which the wireless charging was conventionally impossible.

Further, the degree of freedom of the position between the wireless power transmitter and the wireless power receiver is improved. Thereby, the decrease in the voltage gain due to a position mismatch between a power transmitting coil and a power receiving coil is alleviated, and the power may be transmitted in a wider region using a smaller number of power transmitting coils. An area of the power transmitting coil may also be increased.

The transmission controller 140 or 140_1 or control signal generator 142 in FIGS. 4, 6, and 7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 12 and 13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter comprising:
   a converter configured to output an alternating current (AC) voltage in response to a transmission control signal;
   a power transmitter comprising a power transmitting coil and configured to vary an impedance in response to a resonance control signal, and to receive the AC voltage to wirelessly transmit power; and
   a controller configured to: determine whether a wireless power receiver is preliminarily determined present; perform an optimization operation to find an optimized resonance for the power transmitting coil, with respect to the preliminarily determined present wireless power receiver, through a varying of the transmission control signal and the resonance control signal; determine whether the wireless power receiver is finally determined present based control of the power transmitting coil with the optimized resonance; and, in response to the wireless power receiver being determined to be finally determined present, control wireless transmission of the power to the wireless power receiver to be performed.

2. A wireless power transmitter comprising:
   a converter configured to output an alternating current (AC) voltage in response to a transmission control signal;
   a power transmitter comprising a power transmitting coil and configured to vary an impedance in response to a resonance control signal, and to receive the AC voltage to wirelessly transmit power; and
   a controller configured to determine whether a wireless power receiver is present while varying the transmission control signal and the resonance control signal,
   wherein the controller is configured to
   perform a first sensing operation of determining whether the wireless power receiver is present based on a magnitude of a detected voltage across the power transmitting coil, while varying the transmission control signal and the resonance control signal,
   perform a second sensing operation of redetermining whether the wireless power receiver is present based on a signal received from the wireless power receiver, and
   control an output of the transmission control signal so that power for charging is wirelessly transmitted through the power transmitter after the performing of the first sensing operation and the performing of the second sensing operation.

3. The wireless power transmitter of claim 2, wherein the controller is further configured to perform the second sensing operation when a result of the performing of the first sensing operation includes a determination that the wireless power receiver is present.

4. The wireless power transmitter of claim 2, wherein the controller is further configured to
perform the second sensing operation by determining a frequency of the transmission control signal while performing the first sensing operation, and output the transmission control signal having the frequency determined after performing the first sensing operation.

5. The wireless power transmitter of claim 2, wherein the controller is further configured to:
perform the first sensing operation by outputting the transmission control signal having an initial operating frequency,
calculate a voltage variation, representing a difference between the voltage across the power transmitting coil in a state in which the wireless power receiver is not present and the detected voltage,
compare the voltage variation with a minimum threshold value and a resonance point retrieval threshold value that is greater than the minimum threshold value, and
determine whether the wireless power receiver is present while changing a frequency of the transmission control signal after changing impedance of the power transmitter in a case in which the voltage variation is between the minimum threshold value and the resonance point retrieval threshold value.

6. The wireless power transmitter of claim 5, wherein the controller is further configured to selectively bypass performance of the changing of the frequency of the transmission control signal and the varying of the resonance control signal in response to a determination that the voltage variation is lower than the minimum threshold value, or is equal to or greater than the resonance point retrieval threshold value.

7. The wireless power transmitter of claim 5, wherein the controller is further configured to
retrieve a resonance point at which the voltage variation is a substantially maximum voltage variation while changing the frequency of the transmission control signal between the initial operating frequency and a retrieval end frequency in response to a determination that the voltage variation is equal to or greater than a substantially minimum threshold value, and is lower than the resonance point retrieval threshold value, and
change the resonance control signal in response to a determination that the voltage variation is lower than a resonance gain increase threshold value in a case in which the transmission control signal having a frequency of the resonance point is output.

8. The wireless power transmitter of claim 7, wherein the controller is further configured to:
retrieve the frequency of the transmission control signal at which the voltage variation is the substantially maximum voltage variation while changing the frequency of the transmission control signal between the frequency of the resonance point and the retrieval end frequency after changing the resonance control signal to set the retrieved frequency as the operating frequency; and
perform the second sensing operation.

9. The wireless power transmitter of claim 2, wherein the power transmitter further comprises a variable capacitance circuit configured to have capacitance varied in response to the resonance control signal.

10. The wireless power transmitter of claim 2, wherein the power transmitter further comprises a variable inductor configured to have an inductance varied in response to the resonance control signal.

11. A wireless power transmitter comprising:
a converter configured to output an alternating current (AC) voltage in response to a transmission control signal;
a power transmitter comprising a power transmitting coil and configured to vary an impedance in response to a resonance control signal, and to receive the AC voltage to wirelessly transmit power; and
a controller configured to determine whether a wireless power receiver is present while varying the transmission control signal and the resonance control signal,
wherein the controller comprises:
a sensor configured to detect a voltage across the power transmitting coil and to output a sensed voltage; and
a control signal generator configured to determine a frequency of the transmission control signal and a value of the resonance control signal in response to the sensed voltage, and output the transmission control signal and the resonance control signal.

12. The wireless power transmitter of claim 11, wherein the sensor comprises:
an offset remover configured to output a detection voltage obtained by removing an offset voltage from the voltage across the power transmitting coil;
a voltage divider configured to t-divide the detection voltage to output the sensed voltage;
a direct voltage (DC) voltage setter configured to set a DC offset of the sensed voltage; and
a filter configured to remove a noise component of the sensed voltage.

13. A method for wireless transmission of power by a power transmitting coil of a power transmitter receiving an alternating current (AC) to wirelessly transmit the power, the method comprising:
determining whether a wireless power receiver is preliminarily determined present;
optimizing a resonance of the power transmitting coil, with respect to the preliminarily determined present wireless power receiver, by varying either one or both of an impedance and a capacitance of the power transmitting coil;
determining whether the wireless power receiver is finally determined present with the power transmitting coil having the optimized resonance; and
in response to the wireless power receiver being determined to be finally determined present, wirelessly transmitting the power to the wireless power receiver.

14. A method for wirelessly transmitting power, the method comprising:
determining whether a wireless power receiver is present while varying either one or both of an impedance and a capacitance of a power transmitter receiving an alternating current (AC) voltage to wirelessly transmit power; and
in response to the determination that the wireless power receiver is present, wirelessly transmitting the power to the wireless power receive,
wherein the determining of whether the wireless power receiver is present comprises:
determining whether the wireless power receiver is present based on magnitude of a voltage across a power transmitting coil of the power transmitter; and varying either one or both of the impedance and the capacitance of the power transmitter while the determining of whether the wireless power receiver is present based on the magnitude of the voltage across the power transmitting coil of the power transmitter is performed, and wherein the method further comprises, when a result of the determination of whether the wireless power receiver is present is that the wireless power receiver is present, redetermining whether the wireless power receiver is present using a signal received from the wireless power receiver and perform the wirelessly transmitting of power based on a result of the redetermining.

15. The method of claim 14, wherein the determining of whether the wireless power receiver is present based on the magnitude of the voltage across the power transmitting coil of the power transmitter comprises:

generating the AC voltage having an initial operating frequency, and comparing a voltage variation, representing a difference between a detected voltage across the power transmitting coil and a voltage across the power transmitting coil in a state in which the wireless power receiver is not present, with a minimum threshold value and a resonance point retrieval threshold value;

in response to the voltage variation being equal to or greater than the minimum threshold value and being lower than the resonance point retrieval threshold value, detecting a resonance point at which the voltage variation is a substantially maximum voltage variation while changing the frequency of the AC voltage between the initial operating frequency and a retrieval end frequency; and when the voltage variation at the resonance point is smaller than a resonance gain increase threshold value, adjusting the impedance of the power transmitter.

16. The method of claim 15, wherein the determining of whether the wireless power receiver is present based on the magnitude of the voltage across the power transmitting coil of the power transmitter further comprises setting a frequency at which the voltage variation is the substantially maximum voltage variation as an operating frequency while changing the frequency of the AC voltage between the frequency of the resonance point and the retrieval end frequency after adjusting the impedance of the power transmitter, and wherein, in the redetermining of whether the wireless power receiver is present using the signal received from the wireless power receiver and the wirelessly transmitting of the power to the wireless power receiver, the AC voltage having the operating frequency is applied to the power transmitter.

17. A non-transitory computer-readable storage medium storing instructions that, when executed by a processor, cause the processor to perform the method of claim 14.

* * * * *